(12) United States Patent
Smith (10) Patent No.: US 10,475,023 B2
(45) Date of Patent: Nov. 12, 2019

(54) METHOD AND APPARATUS OF PROCESSING SYMBOLOGY INTERACTIONS BETWEEN MOBILE STATIONS AND A CONTROL SYSTEM

(71) Applicant: AMX LLC, Richardson, TX (US)

(72) Inventor: Darin William Smith, Plano, TX (US)

(73) Assignee: HARMAN PROFESSIONAL, INC., Northridge, CA (US)

( * ) Notice: Subject to any disclaimer, the term of this patent is extended or adjusted under 35 U.S.C. 154(b) by 75 days.

(21) Appl. No.: 15/906,363

(22) Filed: Feb. 27, 2018

(65) Prior Publication Data

US 2018/0189768 A1    Jul. 5, 2018

Related U.S. Application Data

(63) Continuation of application No. 13/534,643, filed on Jun. 27, 2012, now Pat. No. 9,947,005.

(51) Int. Cl.
G06Q 20/32    (2012.01)

(52) U.S. Cl.
CPC ............................... *G06Q 20/3276* (2013.01)

(58) Field of Classification Search
USPC ....................................................... 235/375
See application file for complete search history.

(56) References Cited

U.S. PATENT DOCUMENTS

| | | | | |
|---|---|---|---|---|
| 2010/0012715 | A1* | 1/2010 | Williams | G06Q 20/32 235/375 |
| 2010/0138344 | A1* | 6/2010 | Wong | G06Q 20/10 705/44 |
| 2012/0072843 | A1* | 3/2012 | Durham | G06F 3/041 715/733 |
| 2012/0284638 | A1* | 11/2012 | Cutler | G06Q 10/00 715/751 |
| 2013/0110728 | A1* | 5/2013 | Kobres | G06Q 30/06 705/75 |
| 2013/0111208 | A1* | 5/2013 | Sabin | H04W 4/00 713/171 |
| 2013/0154800 | A1* | 6/2013 | Holmes | G06Q 10/06312 340/10.1 |
| 2013/0334300 | A1* | 12/2013 | Evans | G06K 19/06009 235/375 |

* cited by examiner

*Primary Examiner* — Michael G Lee
*Assistant Examiner* — David Tardif (57) ABSTRACT

Disclosed are an apparatus and method of creating, displaying and utilizing quick response (QR) codes to perform processing an application on a mobile device and a control system network. One example method of operation may include identifying a user information parameter and generating a symbology code image that includes the user information parameter and displaying the symbology code on a mobile device display.

20 Claims, 7 Drawing Sheets

METHOD AND APPARATUS OF PROCESSING SYMBOLOGY INTERACTIONS BETWEEN MOBILE STATIONS AND A CONTROL SYSTEM

TECHNICAL FIELD OF THE INVENTION

This invention relates to a method and apparatus of identifying and processing quick response (QR) codes and performing resulting tasks through a corresponding control system.

BACKGROUND OF THE INVENTION

Conventionally, symbology technologies, such as quick response codes (QR codes), may be used to perform a variety of interactive transactions with a control system (i.e., providing a control command or result). Such interactions are generally one-way in nature, but are still used to provide input to a control system or to receive output from a control system. QR codes may reduce the amount of human hand-keying of data, particularly, complex strings, such as uniform resource identifiers (URIs), session IDs, network IDs, etc.

QR codes have limited functionality with control systems and other applications. In order to create a series of operations or controls that are tied to a QR code interface, additional designs and implementations must be refined to accommodate a substantive response to a user's interaction with a QR code.

SUMMARY OF THE INVENTION

One embodiment of the present invention may include a method that includes accessing an application on a mobile device and identifying at least one user information parameter. The method may also include generating a symbology code image that includes the at least one user information parameter and displaying the symbology code on a mobile device display.

Another example embodiment may include an apparatus including a display and a processor configured to access an application and identify at least one user information parameter, generate a symbology code image that includes the at least one user specific information parameter, and display the symbology code on the display.

DETAILED DESCRIPTION OF THE INVENTION

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as, packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

According to example embodiments of the present invention, the term symbology may refer to any of a number of visual data coding technologies commonly referred to as "barcodes." These barcodes include both 1-dimensional and 2-dimensional (e.g., "QR Codes") representations of visual data coding. Mobile devices including mobile phones and tablet computing devices feature a display and/or a camera. However, the user device may be a computer, laptop, mobile, wireless or cellular phone, a PDA, a tablet, a client a server or any device that contains a processor and/or memory, whether that processor or memory performs a function related to an embodiment of the invention.

The control surface may represent a user interface (UI) for a control system featuring a display and/or camera. A control system may be a networked computing device that executes a customizable program allowing for scheduling and control of various assets, such as but not limited to lighting, motor control, video and audio switching, monitors projectors, and computer interactions in general. Server computers may be used to provide either content (e.g., spreadsheets, documents, presentations, video playback), databases, or applications. Video servers are devices that provide streaming video content to a video switcher, projector, or some other device.

If user information is not known by the system then information may be stored and parsed for one or more commands to initiate a control function used to operate a remote electronic device controlled by the control system, such as a peripheral light, motor control, a computer application, a relay, a binary logic signal interface (simple on/off reflection of state; e.g., a remote trigger), communications interface (e.g., serial port or network port whether wired or wireless), data service whether existing on a particular machine, or as a distributed/cloud service.

A control message may be directed to a particular device, but may also be updated along with a token/preference/setting for some distributed/cloud service or application. The corresponding setting, in turn, may be enacted by autonomous entities or applications. As a result, a message may be transmitted to the ultimate application that is currently operating without even having knowledge of the existence or particular operations of the application.

Example embodiments provide symbology technology which is used to perform a variety of interactive transactions with a control system, such as identify data from a mobile device to a control system (i.e., user-provided symbol), identify and/or authenticate a specific user and/or user device with the control system, customize a user's control surface and user interface (UI), recall user-customized presets to environment (e.g., lighting, HVAC, active devices, video source selection). The control system and symbology may also be used to register an activity room and/or certain resources as being "in-use", and activate or revoke permissions for user-locked features of a control system (e.g., licensed features, security controls, or controlled resource (s)) including parental control in a home environment. The control system may also provide a recall for user-scheduled content on a managed content server and/or a presentation system, and permit inputted hyperlinks or bookmarks from a mobile device to the control system or a corresponding peripheral device.

Figure 1A:
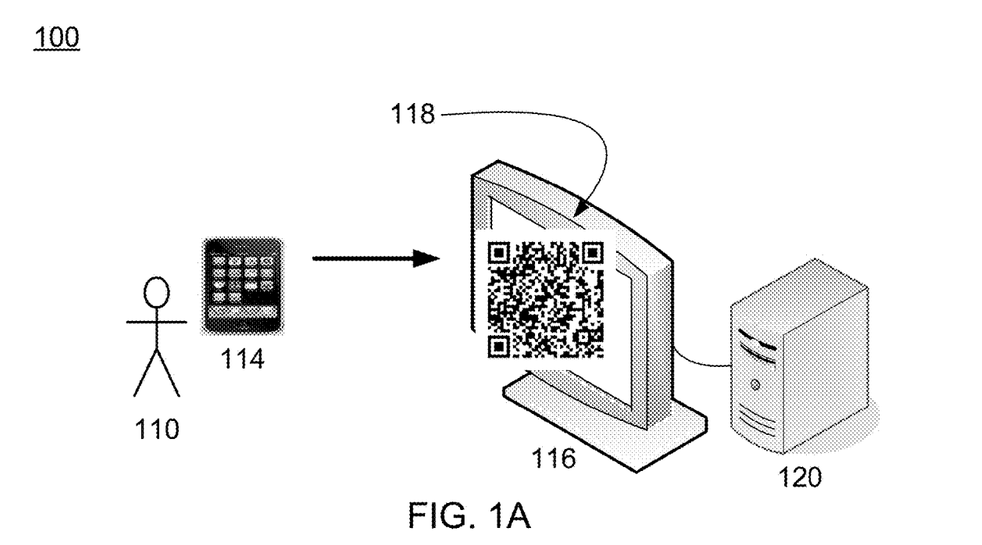
FIG. 1A illustrates example network configuration with a control system initiated QR code, according to example embodiments of the present invention.

FIG. 1A illustrates an example symbology interaction 100 according to example embodiments. Referring to FIG. 1A, the user 110 may operate a mobile station 114 (i.e., smartphone), which is configured with a scanner, camera or other identification device (not shown) that is configured to view a QR code 118 provided on a computer display device 116 connected to a computer or server 120. The QR code 116 may be presented to the user to allow a login function, an information sharing function, or other communication function.

Figure 1B:
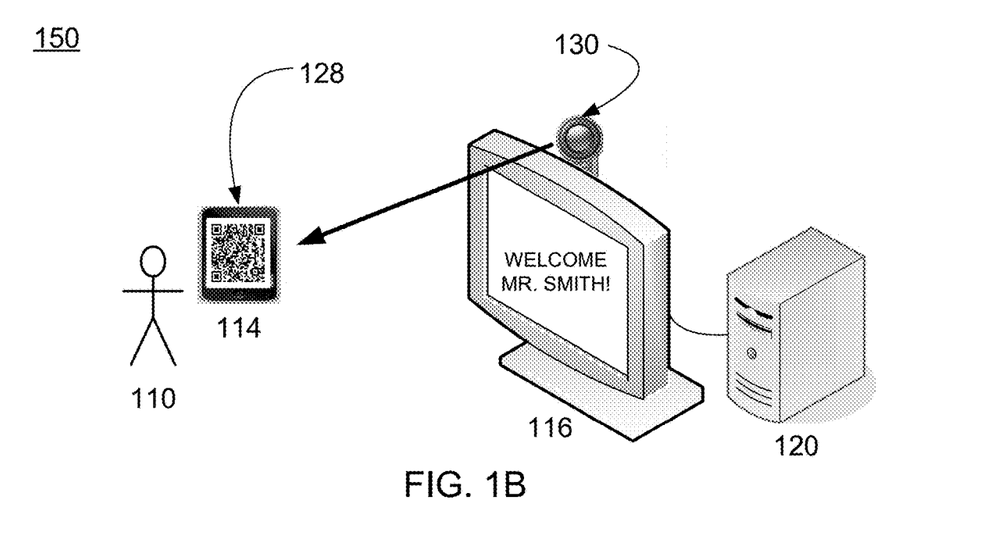
FIG. 1B illustrates example network configurations with a mobile station initiated QR code, according to example embodiments of the present invention.

FIG. 1B illustrates another example symbology interaction 150 according to example embodiments. Referring to FIG. 1B, the user 110 may initiate a command, request, data authentication, etc., and the user agent application may generate a resulting QR code 128 on his or her own smartphone device. The code may then be presented to a computer 120 and corresponding camera device 130. As a result, the user may be identified by the QR code provided and a message may be displayed on the display device acknowledging the user's presence.

In FIG. 1A, a transfer of data is performed from the control system computer 120 to a mobile device 114 by a symbol 118. Examples of such information transferred may include a one-time guest login credential for wireless networks interfaced with the control system. Sharing hyperlinks or bookmarks from a control system or the attached peripheral or computer 120 to the mobile device 114, a hand-off control to a mobile application (e.g., a remote frame buffer (RFB) to a touchpanel display from the mobile device).

In FIG. 1B, for cases of transferring data from a mobile device 114 to a control system computer 120, the control system must employ an accessory camera 130 (e.g., touchpanel control surface 116 with integral camera) and an application to process the symbology. In operation, the user would initiate an action by activating a reader application on the control surface, as well as a corresponding application, such as a user ID application on the mobile device 114. Once the mobile device application generates the symbology, the user would hold the screen of the mobile device within view of the control system's camera as illustrated in FIG. 1B. Upon a successful read of the symbology present on the mobile station display, the control system would perform the action directed by the mobile application, for example, to configure a meeting room for the user's preferences (e.g., projector on/off, automatic screen down/up, software application launched, user files accessed, etc.). The user's credentials, preferences and other related information may be stored in a databank associated with the corresponding server 120 of the control system.

During the procedure of transferring data from the control system computer 120 to a mobile device 114, the control system must employ an attached display 116, such as a touchpanel to generate symbology to encode the data. The mobile device 114 incorporates a camera (not shown) and utilizes an application capable of reading the symbology and performing corresponding functions. An example would be an remote frame buffer (RFB) application on a mobile device. If a user desires to act on a touchpanel via a mobile device, the user would start the RFB application on the mobile device and push a control on the touchpanel to activate screen-sharing. If allowed by the control system, the touchpanel could then display a symbology code (i.e., QR code) to communicate corresponding network information, such as an IP address, port number, a session key for security to the mobile application, etc. The mobile device would identify the QR code, process the information included in the QR code and automatically login without delay. This communication and interaction scenario reduces the user's interaction to a simple series of button selections without any data string inputs or other information submissions (i.e., login username, IP address, etc.), which can be easily mistyped or forgotten.

A user application may generate and present a one-time form or QR code that can later be reset if necessary. The application may collect the user data and securely store it in a device's non-volatile storage via any number of encryption schemes, which could be employed to secure the data depending on the device type. Such an operation may be based on the operating system of the mobile station. In order to preserve security, the user data should be encrypted/hashed before forming the QR code. Data encryption standard (DES) is commonly used for this purpose, but other algorithms are available and may be used as well. There are several different common ways to encode information in either a QR code or traditional barcode. The QR has a higher density of information available, and efficient error correction. An alternative method for obtaining the user data would be via a certificate generated on a user database and loaded onto the devices via some other means (e.g., network connection, flash drive, etc).

Figure 2:
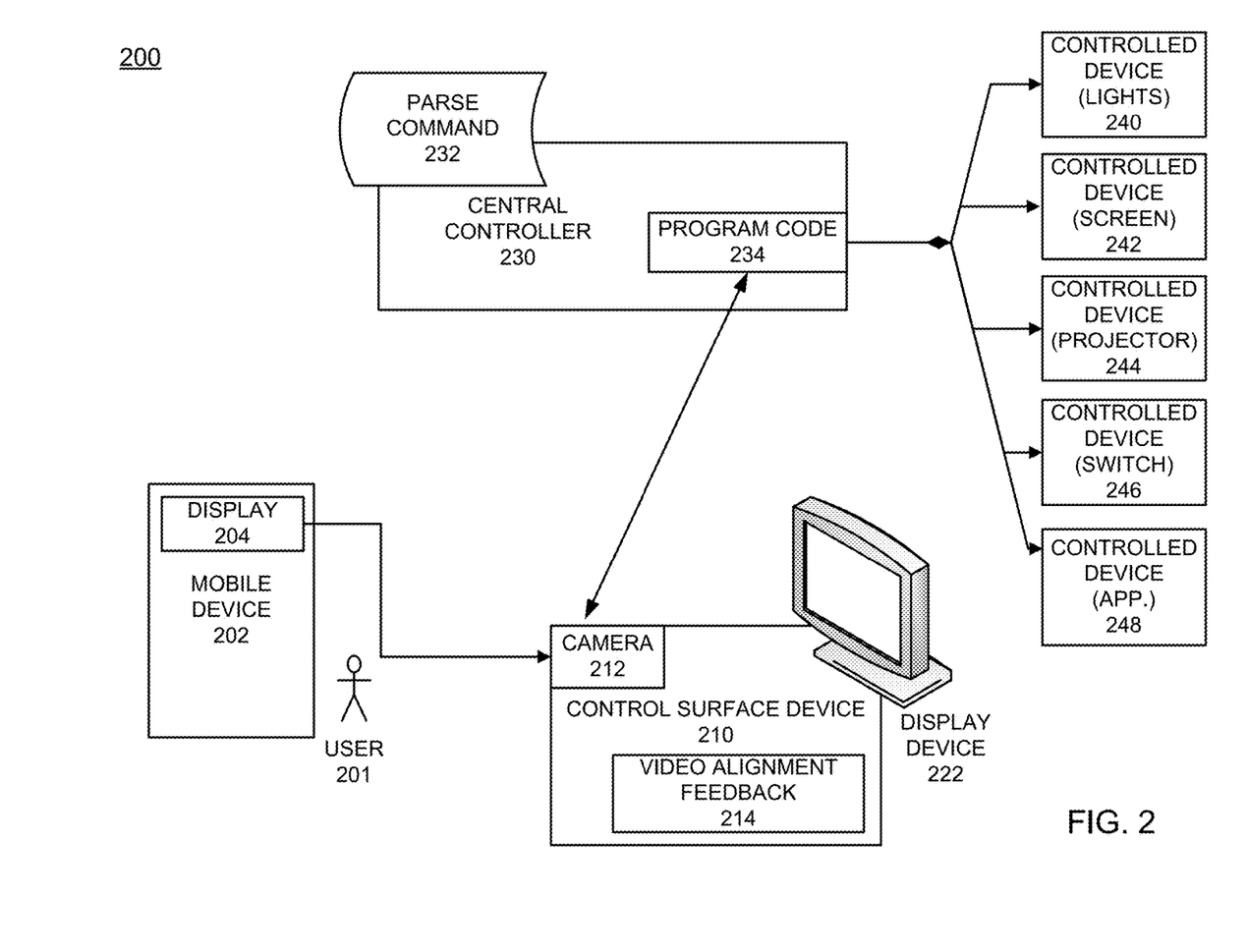
FIG. 2 illustrates an example communication session with a mobile station initiated symbology reader application, according to an example method of operation of the present invention.

FIG. 2 illustrates an example symbology interaction between a mobile station and a control system according to example embodiments. Referring to FIG. 2, the symbology interaction network 200 may include a user 201 operating a mobile station device 202 with a display 204. The mobile device may include a code generation application that is capable of receiving input commands and creating corresponding QR codes on the display of the mobile device. Once a symbol or code is generated the user may bring the code within view of a camera 212 associated with the control surface device 210, which may include a computer (not shown) and a display device 222. A video alignment feedback function 214 may provide a focusing and processing function used to identify the code properly and interpret the corresponding data associated with the code.

Once the code has been received by the camera 212, the user may be identified by a user databank and an application-specific token may be generated and sent to a central controller device 230. The program code information may be received and interpreted to control one or more controlled devices/peripherals, such as, lights 240, a display screen 242, a device projector 244, a switch 246 and/or a device application 248. A parse command function 232 may be a script used to parse out any commands from the user generated control information.

In addition, the user may interact with the control surface of the mobile device to launch a symbology reader application. The application activates the camera and optionally provides a feedback video for help in QR code alignment. For example, the user displays the mobile device display 204 (e.g., mobile phone, tablet computer, wristwatch with embedded computer and display screen, etc.) within view of the camera 212 and activates an application that shares information via a symbology code. The user interacts with the mobile device application to produce a symbology code on the display. The user may hold the mobile device screen within view of the control surface camera 212, utilizing a feedback window (if present) on the control surface for help in alignment/aiming. As a result, the control surface provides any necessary feedback (visual and/or audible) upon successful reading of the symbol. The control surface device 210 then processes the data given by the symbol. For example, the symbol could have encoded a command to switch a particular video switcher input to a specific output. The control surface device would forward the control request to the central controller 230, which would then process the control request. Other examples may include generating and sharing a hyperlink to cause a displayed computer source to navigate a browser to a link provided as an alternative type of input code. Additional functions of the user input may provide authentication and linking of a phone to act as a control input, passing hotspot network credentials, and sending contact information to a database.

Figure 3A:
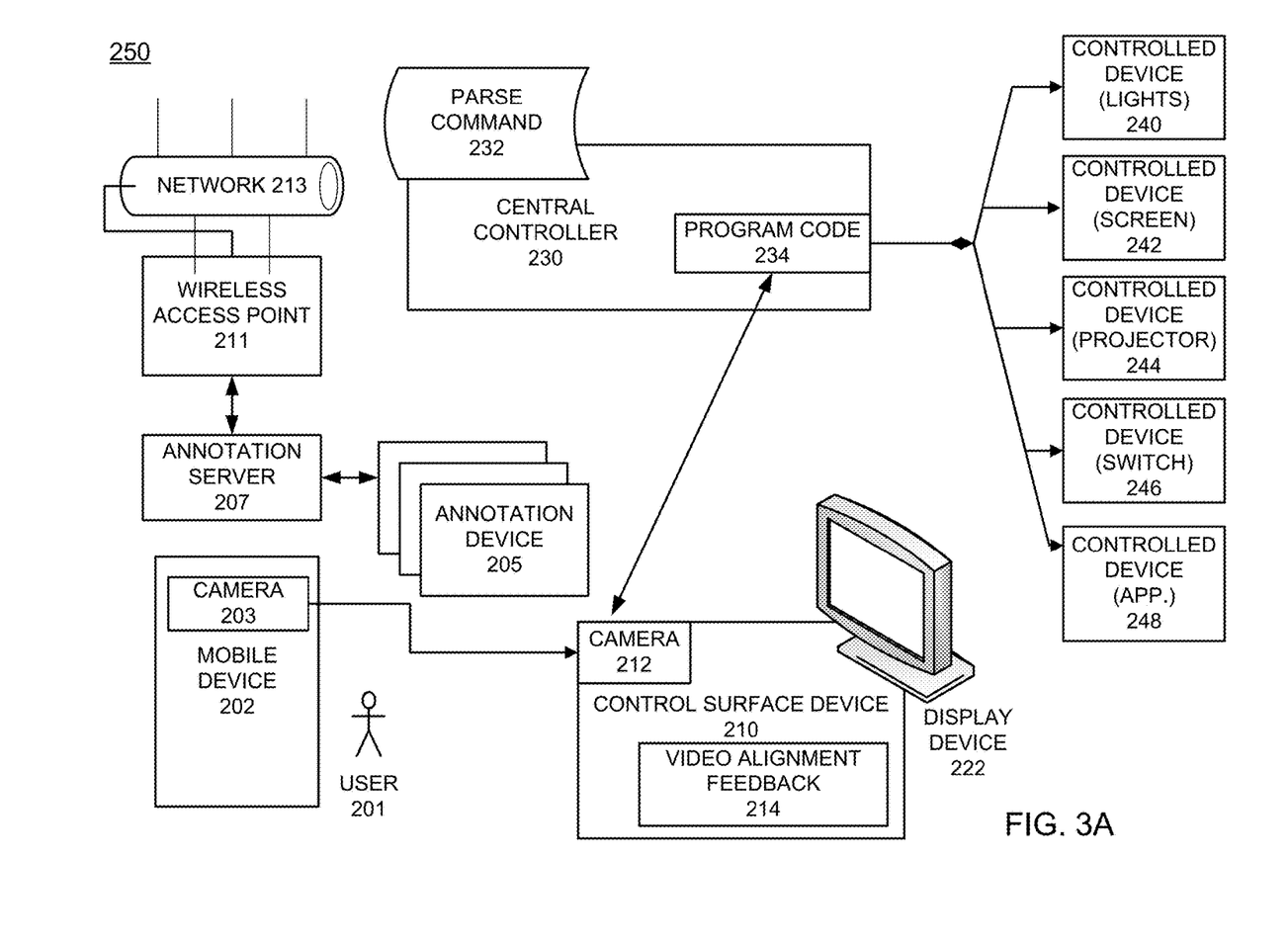
FIG. 3A illustrates an example data exchange communication session between a mobile station and a control system, according to an example method of operation of the present invention.

FIG. 3A illustrates an example symbology interaction between a mobile station and a control system according to example embodiments. Like elements presented in FIG. 2 may be the same as the corresponding elements illustrated in FIG. 3A. Referring to FIG. 3A, the symbology interaction network 250 may include a user 201 operating a mobile station device 202 with a display 204. The mobile device 202 may include a code generation application that is capable of receiving input commands and creating corresponding QR codes on the display of the mobile device. Once a symbol or code is generated, the user may bring the code within view of a camera 212 associated with the control surface device 210, which may include a computer (not shown) and a display device 222. A video alignment feedback function 214 may provide a focusing and processing function used to identify the code properly and interpret the corresponding data associated with the code.

In FIG. 3A, a data exchange session may be activated between the control system components and the mobile device 202. For example, transferring of user contact information from an address book application on the mobile device or a remote database, transferring a web link, transmitting a token to join an annotation session and/or transmitting credentials for pairing the mobile device 202 with a Bluetooth or WiFi access point connection.

In operation, the user 201 may bring the mobile device 202 having a camera 203 within view of the display device 222 on a control surface device 210. The control surface may be operating an application that generates symbology for some particular action. When the user executes a compatible application on the mobile device and scans the control surface's generated symbol with the mobile device camera 203, some action dictated by the symbology may occur. For example, suppose a network-enabled annotation session (i.e., live presentation, teleconference) is active with various devices in the control system. Also, assuming an application exists for the mobile device platform that allows participation in the annotation session, then when the mobile device annotation application scans a symbol from the control surface (e.g., QR code), the mobile device 202 is able to decode WiFi access/credentials from the symbol credentials to join the network as a guest user, as well as a code to allow a unique join operation of the annotation session. The annotation session may include a least one annotation device 204 (i.e., display device) operated by a annotation server 207 that is accessible via a network 213 coupled to a wireless access point 207. The above-noted example of FIG. 3A, is just one interactive example. Many other example can be imagined for one-way communication of information out of a control system to minimize human data entry, enabling interaction with mobile devices.

According to example embodiments, it should be noted that for an exchange of data from a control system to the mobile device, the display of the symbology need not be limited to the display on the control surface. Rather, any display technology for which the control system may overlay the symbology graphic may be utilized to communicate the information. As a specific example, the described example of joining an annotation session may be carried out by displaying the session key via a QR code on a projected display that utilizes the same graphic overlay capability used by the annotation application itself. As a result, the annotation component attached to the control system and projector may render the symbol from data provided by the control system (i.e., the session key).

Figure 3B:
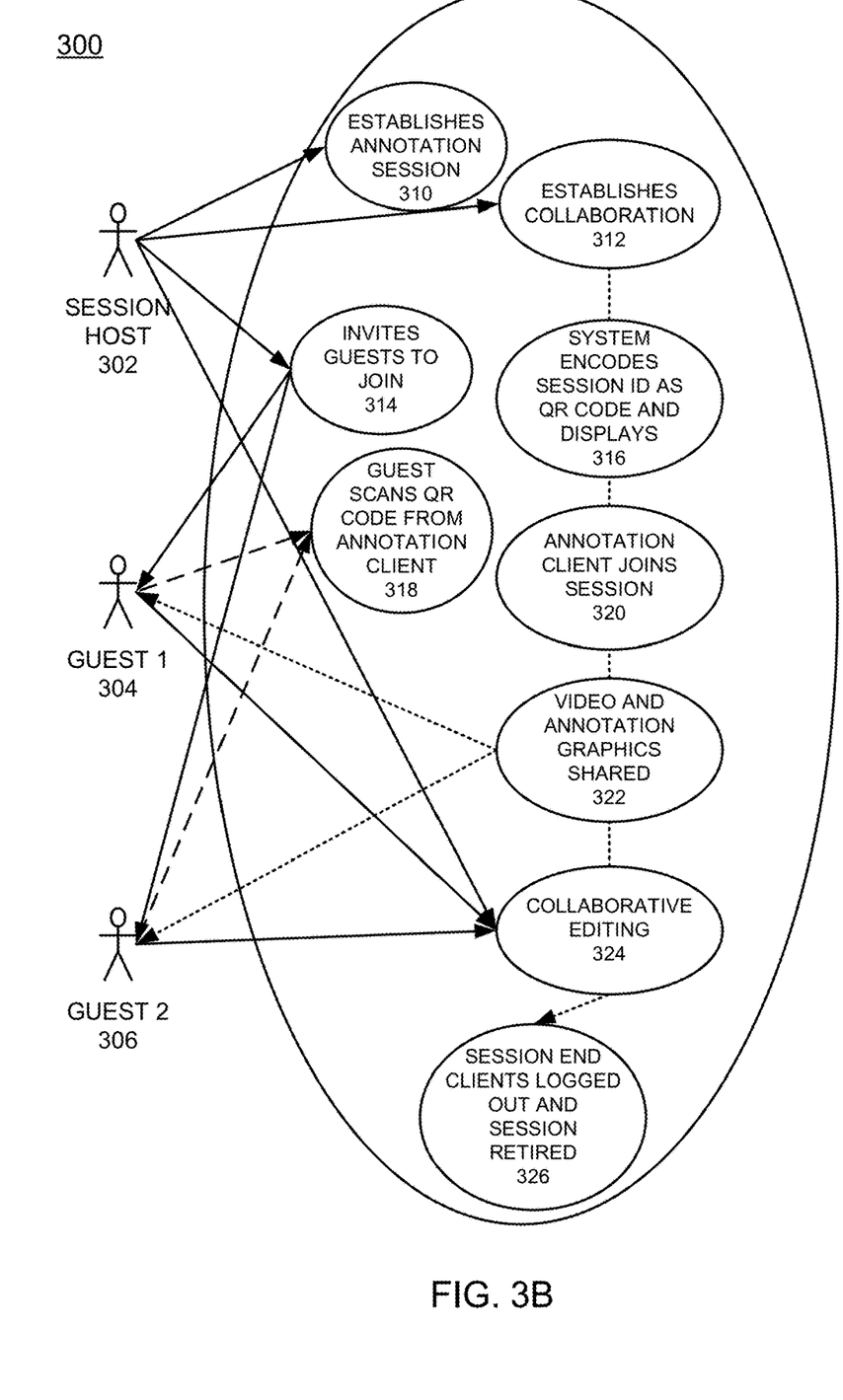
FIG. 3B illustrates an example user annotation participation model according to example embodiments.

FIG. 3B illustrates an example annotation session according to example embodiments of the present invention. Referring to FIG. 3B, an annotation application is used for an application to be written for mobile devices that could display the source media as well as overlay the annotation graphics. In order to participate in an annotation, a device would need to be authorized as illustrated in FIG. 3B. For example, the annotation session 300 may provide a session host 302 establishing the annotation session 310 and establishing a collaboration 312 for other guests to join. The first guest 304 may receive an invitation message 314 to join the collaboration effort. The system may encode a session ID and generate a corresponding QR code 316 for display. As a result, the guest 304 may scan the QR code from an annotation client application 318 allowing the annotation client to join the session 320. Next, a video and annotation graphics application may be shared 322 with another guest 306 who may also join the collaboration similar to guest 304. Any of the users may perform collaborative editing 324 to update the collaborative session and the session may end when the clients log out and the session is retired 326.

Figure 4:
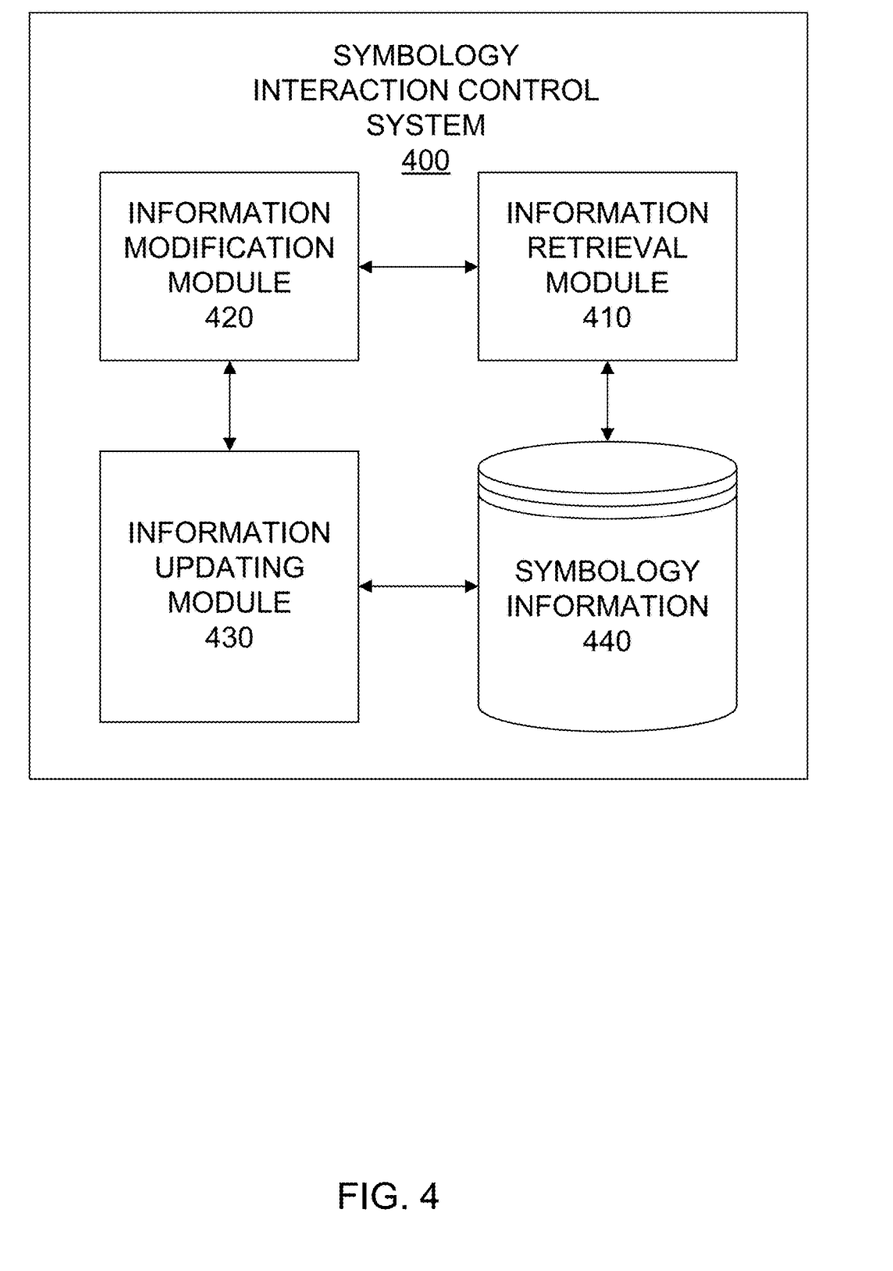
FIG. 4 illustrates an example symbology interaction control system according to example embodiments.

FIG. 4 illustrates an example symbology interaction control system 400 configured to perform operations according to example embodiments of the present invention. Referring to FIG. 4, The system 400 may access an application on a remote mobile device and identify at least one user information parameter responsive to a user action, or automatically in an effort to generate symbology and access the control system. The user may initiate the action by controlling the symbology application manually, or the symbology application may detect the control system via a Bluetooth or WiFi connection and generate the symbology code automatically in an effort to identify the user of the mobile device and gain access to the control system. The user information may be stored in the symbology information databank 440 and retrieved by the information retrieval module 410. Further operations may include generating a symbology code image on the mobile device that includes the user specific information parameter and displaying the symbology code on a mobile device display. As a result, the control system 400 may have a camera or image identifying device and may scan and process the symbology code. The information included in the symbology code may be cross-referenced with pre-stored user information that is stored in the information databank 440.

The user information parameter(s) provided by the mobile station may identify at least one user preference. If the user information is not known by the system 400 then the information modification module 420 may store the information and parse one or more commands from the user information to initiate a control function used to operate a remote electronic device controlled by the control system, such as a peripheral light, motor control, and/or a computer application. Examples of the user information may include a username, password and/or mobile device information. A generated symbology code on the mobile device may be displayed to a control device associated with the control system resulting in the automatic logging of the mobile device into a communication network operated by the control device. The mobile device may then receive wireless communication access responsive to the mobile device being logged into the communication network. Any information not previously stored in the control system 400 may be identified and stored in the databank 440 by the information updating module 430.

Figure 5:
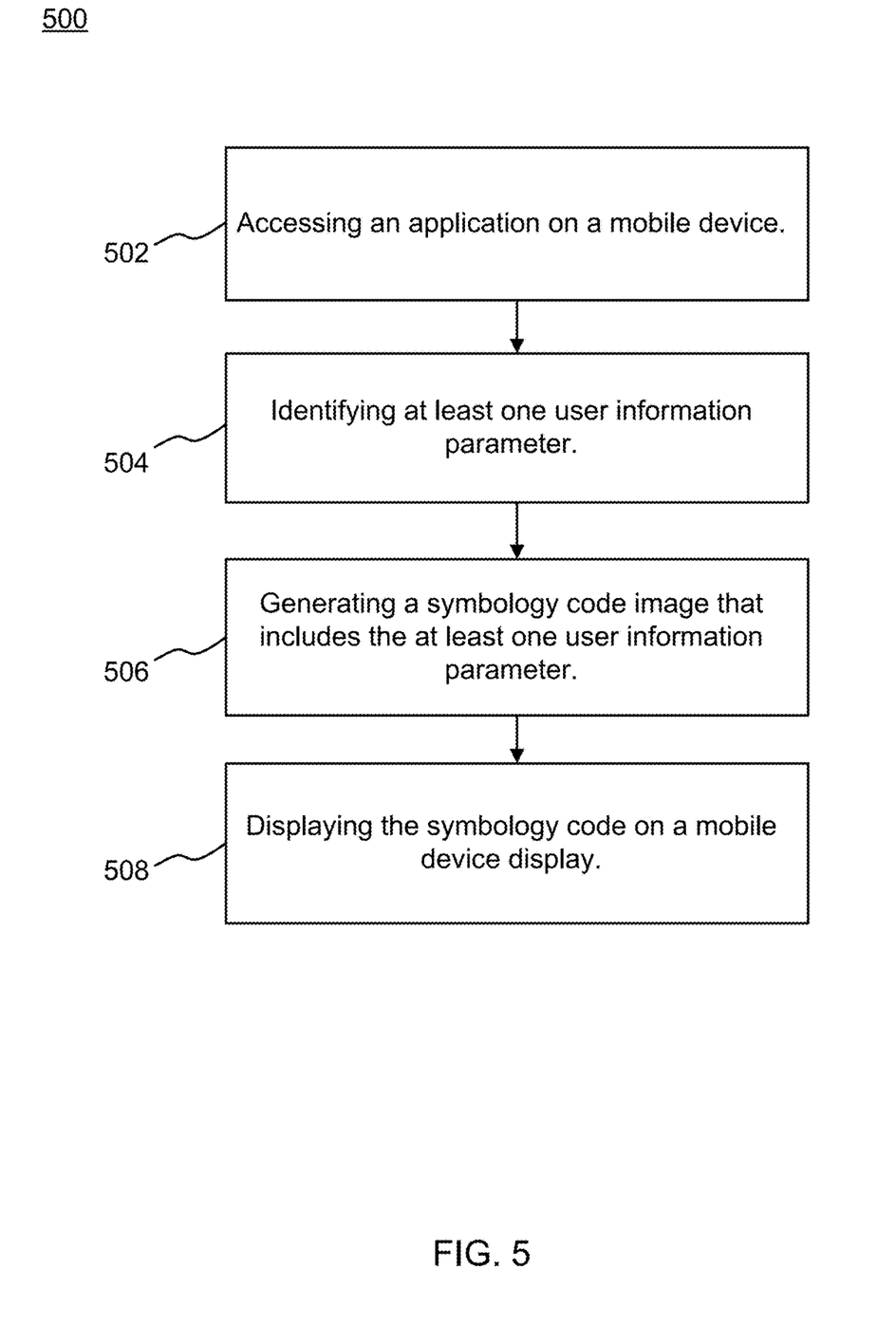
FIG. 5 illustrates a flow diagram of an example method of operation according to an example embodiment of the present invention.

One example method of operation is illustrated in the flow diagram of FIG. 5 Referring to FIG. 5 the flow diagram 400 includes accessing an application on a mobile device at operation 52 and identifying at least one user information parameter at operation 504. The method may also include generating a symbology code image that includes the at least one user information parameter at operation 506 and displaying the symbology code on a mobile device display at operation 508.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 6 illustrates an example network element 600, which may represent any of the above-described network components, etc.

Figure 6:
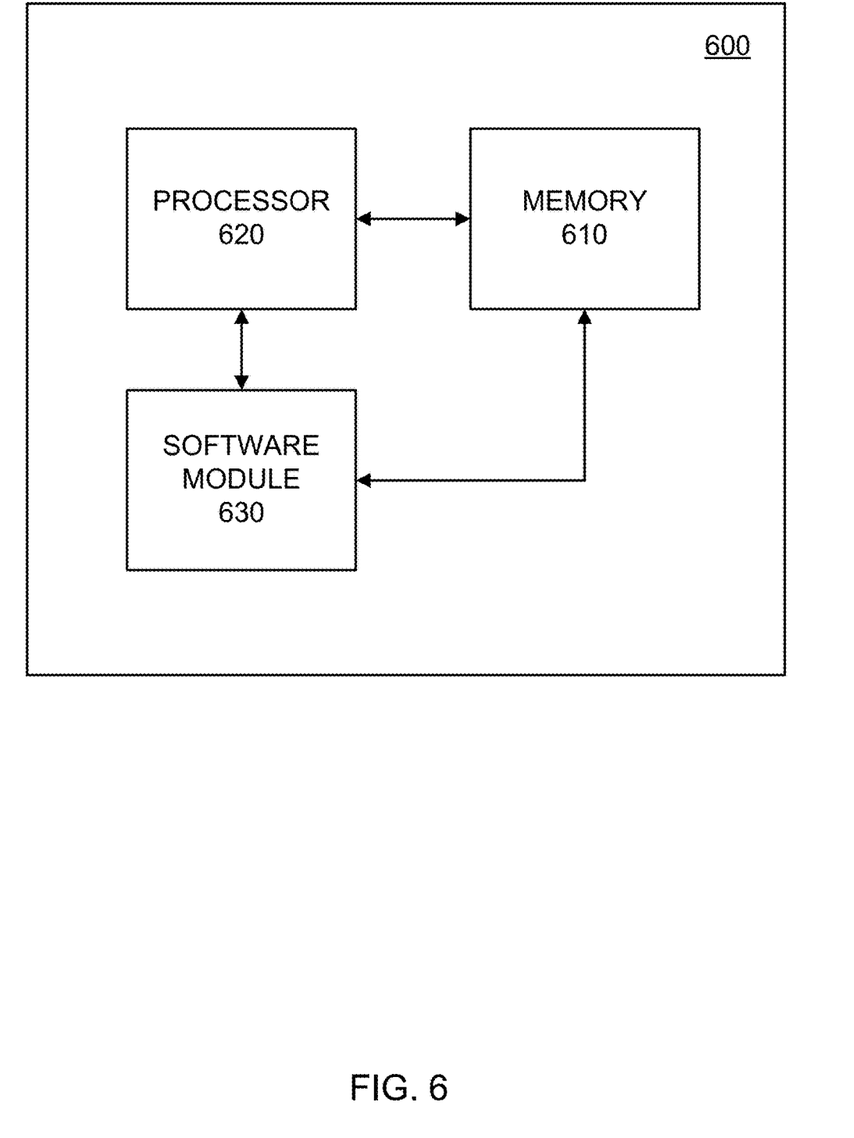
FIG. 6 illustrates an example network entity device configured to store instructions, software, and corresponding hardware for executing the same, according to example embodiments of the present invention.

As illustrated in FIG. 6, a memory 610 and a processor 620 may be discrete components of the network entity 600 that are used to execute an application or set of operations. The application may be coded in software in a computer language understood by the processor 620, and stored in a computer readable medium, such as, the memory 610. The computer readable medium may be a non-transitory computer readable medium that includes tangible hardware components in addition to software stored in memory. Furthermore, a software module 630 may be another discrete entity that is part of the network entity 600, and which contains software instructions that may be executed by the processor 620. In addition to the above noted components of the network entity 600, the network entity 600 may also have a transmitter and receiver pair configured to receive and transmit communication signals (not shown).

Although an exemplary embodiment of the system, method, and computer readable medium of the present invention has been illustrated in the accompanied drawings and described in the foregoing detailed description, it will be understood that the invention is not limited to the embodiments disclosed, but is capable of numerous rearrangements, modifications, and substitutions without departing from the spirit or scope of the invention as set forth and defined by the following claims. For example, the capabilities of the systems illustrated in FIGS. 1A, 1B, 2, 3A, 3B and 4 can be performed by one or more of the modules or components described herein or in a distributed architecture. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:
1. A method, comprising:
generating a symbology code, via a mobile device;
identifying, via a controller, a command control request based on the symbology code;

utilizing the command control request to operate, via the controller, a remote electronic device to be used during a collaborative session with at least one invited guest; and collaboratively editing an annotation session within the collaborative session by at least one user and the at least one invited guest.

2. The method of claim 1, comprising identifying at least one user information parameter used to access the annotation session of the collaborative session via the mobile device.

3. The method of claim 2, wherein the at least one user information parameter is a control function used to operate the remote electronic device.

4. The method of claim 1, wherein the remote electronic device comprises at least one of a light, motor control, computer application, relay, binary logic signal interface and a communications interface.

5. The method of claim 2, wherein the at least one user information parameter comprises a username, password and mobile device information.

6. The method of claim 1, further comprising:
displaying the symbology code to a control device; and
automatically logging the mobile device into a communication network operated by the control device responsive to the displayed symbology code.

7. The method of claim 6, further comprising receiving wireless communication access at the mobile device responsive to logging the mobile device into the communication network.

8. An apparatus, comprising:
a display; and
a processor communicably coupled to the display, and configured to:
  generate a symbology code, via a mobile device;
  identify, via a controller, a command control request based on the symbology code;
  utilize the command control request to operate, via the controller, a remote electronic device to be used during a collaborative session with at least one invited guest; and
  collaboratively edit an annotation session within the collaborative session by at least one user and the at least one invited guest.

9. The processor of claim 8, wherein the processor is configured to identify at east one user information parameter used to access the annotation session of the collaborative session via the mobile device.

10. The apparatus of claim 9, wherein the at least one user information parameter is a control function used to operate the remote electronic device.

11. The apparatus of claim 8, wherein the remote electronic device comprises at least one of a light, motor control, computer application, relay, binary logic signal interface and a communications interface.

12. The apparatus of claim 9, wherein the at least one user information parameter comprises a username, password and mobile device information.

13. The apparatus of claim 8, wherein the processor displays the symbology code to a control device and automatically log a user into a communication network operated by the control device responsive to the displayed symbology code.

14. The apparatus of claim 13, further comprising a receiver that receives wireless communication access responsive to the user being logged into the communication network.

15. A non-transitory computer readable storage medium to store instructions that when executed cause a processor to perform:
generating a symbology code image, via a mobile device;
identifying, via a controller, a command control request based on the symbology code image;
utilizing the command control request to operate, via the controller, a remote electronic device to be used during a collaborative session with at least one invited guest; and
collaboratively editing an annotation session within the collaborative session by at least one user and the at least one invited guest.

16. The non-transitory computer readable storage medium of claim 15, wherein the processor performs identifying at least one user information parameter used to access the annotation session of the collaborative session via the mobile device.

17. The non-transitory computer readable storage medium of claim 16, wherein the at least one user information parameter is a control function used to operate the remote electronic device.

18. The non-transitory computer readable storage medium of claim 15, wherein the remote electronic device comprises at least one of a light, motor control, computer application, relay, binary logic signal interface and a communications interface.

19. The non-transitory computer readable storage medium of claim 15, wherein the at least one user information parameter comprises a username, password and mobile device information.

20. The non-transitory computer readable storage medium of claim 15, wherein the processor performs:
displaying the symbology code to a control device;
automatically logging the mobile device into a communication network operated by the control device responsive to the displayed symbology code; and
receiving wireless communication access at the mobile device responsive to logging the mobile device into the communication network.

* * * * *